US007565372B2

(12) United States Patent
Zhang et al.

(10) Patent No.: US 7,565,372 B2
(45) Date of Patent: Jul. 21, 2009

(54) EVALUATING AND GENERATING SUMMARIES USING NORMALIZED PROBABILITIES

(75) Inventors: Benyu Zhang, Beijing (CN); Hua-Jun Zeng, Beijing (CN); Wei-Ying Ma, Beijing (CN); Zheng Chen, Beijing (CN); Hua Li, NanJing (CN)

(73) Assignee: Microsoft Corporation, Redmond, WA (US)

( * ) Notice: Subject to any disclaimer, the term of this patent is extended or adjusted under 35 U.S.C. 154(b) by 252 days.

(21) Appl. No.: 11/225,861

(22) Filed: Sep. 13, 2005

(65) Prior Publication Data
US 2007/0061356 A1    Mar. 15, 2007

(51) Int. Cl.
*G06F 17/00* (2006.01)
(52) U.S. Cl. ...................................... 707/102; 707/200
(58) Field of Classification Search ........................ None
See application file for complete search history.

(56) References Cited

U.S. PATENT DOCUMENTS

| | | | | |
|---|---|---|---|---|
| 5,467,425 | A * | 11/1995 | Lau et al. | 704/243 |
| 6,317,708 | B1 * | 11/2001 | Witbrock et al. | 704/9 |
| 6,963,830 | B1 * | 11/2005 | Nakao | 704/1 |
| 2002/0085227 | A1 * | 7/2002 | Botchkarev | 358/1.15 |
| 2004/0056783 | A1 * | 3/2004 | Fallon | 341/51 |
| 2004/0064792 | A1 * | 4/2004 | Sugimoto | 715/526 |
| 2004/0117740 | A1 * | 6/2004 | Chen et al. | 715/531 |
| 2004/0199375 | A1 * | 10/2004 | Ehsani et al. | 704/4 |

OTHER PUBLICATIONS

Leuski et al., iNeATS: Interactive Multi-Document Summarization, 2003, University of Southern California.*
Leuski et al., Cross-lingual C*ST*RD: English Access to Hindi Information, 2003, USC Information Sciences Institute.*
Koumpis et al., Automatic Summarizatoin of Voicemail Messages Using Lexical and Prosodic Features, Jul. 2005, Vienna Telecommunications Research Center.*
Gao et al., Toward a Unified Approach to Statistical Language Modeling for Chinese, 2002, Microsoft Research.*
Gao et al., Dependence Language Model for Information Retrieval, 2004, Tianjin University.*
Baldwin, Breck and Thomas S. Morton, "Dynamic Coreference-Based Summarization," In Proceedings of the Third Conference on Empirical Methods in Natural Language Processing, Jun. 1998, 6 pages.
Brandow, Ronald, Karl Mitze and Lisa F. Rau, "Automatic Condensation of Electronic Publications by Sentence Selection," Information Processing & Management, vol. 31, No. 5, pp. 674-685, 1995 Elsevier Science Ltd.
Lavrenko, Victor and W. Bruce Croft, "Chapter 2—Relevance Models in Information Retrieval," Language Modeling for Information Retrieval, edited by W. Bruce Croft and John Lafferty, 2003 Kluwer Academic Publishers, 52 pages.

(Continued)

*Primary Examiner*—Neveen Abel Jalil
*Assistant Examiner*—Son T. Hoang
(74) *Attorney, Agent, or Firm*—Perkins Coie LLP

(57) ABSTRACT

A summary system for evaluating summaries of documents and for generating summaries of documents based on normalized probabilities of portions of the document. A summarization system generates a summary by selecting sentences for the summary based on their normalized probabilities as derived from a document model. An evaluation system evaluates the effectiveness of a summary based on a normalized probability for the summary that is derived from a document model.

11 Claims, 6 Drawing Sheets

OTHER PUBLICATIONS

Chen, Stanley F. and Joshua Goodman, "An Empirical Study of Smoothing Techniques for Language Modeling," Microsoft TR-10-98, pp. 310-318.

Charniak, Eugene, "Chapter 2—Statistical Models and the Entropy of English," Statistical Language Learning, 1993 Massachusetts Institute of Technology, 23 pages.

Zue, Victor and Ron Cole, "Chapter 1—Spoken Language Input," Survey of the State of the Art in Human Language Technology, Ronald Cole, Joseph Mariani, Hans Uskoreit, Annie Zaenen and Victor Zue, 1996 Cambridge University Press, 69 pages.

Bell, Timothy C., John G. Cleary and Ian H. Witten, "Chapter 2—Information and Models, and Chapter 4—Modeling Natural Language," Text Compression, 1990, Prentice-Hall, Inc., 59 pages.

Donaway, Robert L., Kevin W. Drummey and Laura A. Mather, "A Comparison of Rankings Produced by Summarization Evaluation Measures," ANLP-NAACL, Seattle 2000, pp. 69-78.

Kernighan, Mark D., Kenneth W. Church, William A. Gale, "A Spelling Correction Program Based on a Noisy Channel Model," In Proceedings of the 13th International Conference on Computational Linguistics, 1990, pp. 205-210.

Deerwester, Scott, Susan T. Dumais, Richard Harshman, "Indexing by Latent Semantic Analysis," Journal of the America Society for Information Science, vol. 41, 1990, 34 pages.

Hovy, Eduard and Chin-Yew Lin, "Automated Text Summarization in SUMMARIST," Advances in Automatic Text Summarization, I. Mani and M. Mayberry, editors, 1999, 14 pages.

Brown, Peter F., John Cocke, Stephen A. Della Pietra, Vincent J. Della Pietra, Fredrick Jelinek, John D. Lafferty, Robert L. Mercer and Paul S. Roossin, "A Statistical Approach to Machine Translation," Computational Linguistics, Jun. 1990, 24 pages.

Freitas, Nando de and Kobus Barnard, "Bayesian Latent Semantic Analysis of Multimedia Databases," University of British Columbia Technical Report TR-2001-15, 2001, 36 pages.

Gong, Yihong and Xin Liu, "Generic Text Summarization Using Relevance Measure and Latent Semantic Analysis," SIGIR 2001, ACM 2001, pp. 19-25.

Carbonell, Jaime and Jade Goldstein, "The Use of MMR, Diversity-Based Reranking for Reordering Documents and Producing Summaries," In Proceedings of SIGIR 1998, pp. 335-336.

Goldstein, Jade, Mark Kantrowitz, Vibhu Mittal, and Jaime Carbonell, "Summarizing Text Documents: Sentence Selection and Evaluation Metrics," SIGIR 1999, ACM 1999, pp. 121-128.

Luhn, H. P., "The Automatic Creation of Literature Abstracts," IBM Journal, Apr. 1958, pp. 159-165.

Jing, Hongyan, Regina Barzilay, Kathleen McKeown and Michael Elhadad, "Summarization Evaluation Methods: Experiments and Analysis," American Association for Artificial Intelligence Spring Symposium Series, 1998, 9 pages.

Hull, Jonathan J., "Combining Syntactic Knowledge and Visual Text Recognition: A Hidden Markov Model for Part of Speech Tagging In a Word Recognition Algorithm," AAAI Symposium: Probabilistic Approaches to Natural Language, 1998, pp. 77-83.

Church, Kenneth Ward, "A Stochastic Parts Program and Noun Phrase Parser for Unrestricted Text," In Proceedings of the Second Conference on Applied Natural Language Processing, 1988, pp. 136-143.

Lin, Chin-Yew and Eduard Hovy, "Automatic Evaluation of Summaries Using N-gram Co-Occurrence Statistics," In Proceedings of the Human Technology Conference 2003, 8 pages.

Silber, H. Gregory and Kathleen F. McCoy, "Efficient Text Summarization Using Lexical Chains," Intelligent User Interfaces, 2000, 4 pages.

Landauer, Thomas K., Peter W. Foltz, Darrell Laham, "An Introduction to Latent Semantic Analysis," Introduction to Latent Semantic Analysis, Discourse Processes, 25, 1998, pp. 1-41.

Mitra, Mandar, Amit Singhal and Chris Buckley, "Automatic Text Summarization by Paragraph Extraction," In Proceedings of the ACL/EACL 1997 Workshop on Intelligent Scalable Text Summarization, pp. 1-11.

Cover, Thomas and Joy A. Thomas, "Chapter 2—Entropy, Relative Entropy and Mutual Information," Elements of Information Theory, 1991 John Wiley & Sons, Inc., 47 pages.

Strzalkowski, Tomek, Jin Wang and Bowden Wise, "A Robust Practical Text Summarization," AAAI Intelligent Text Summarization Workshop 1998, pp. 26-33.

Over, Paul, "Introduction to DUC-2001: an Intrinsic Evaluation of Generic News Text Summarization Systems," Retrieval Group, Information Access Division, National Institute of Standards and Technology, pp. 1-56.

Mittal, Vibhu, Mark Kantrowitz, Jade Goldstein and Jaime Carbonell, "Selecting Text Spans for Document Summaries: Heuristics and Metrics," 1999 American Association of Artificial Intelligence, 7 pages.

Papineni, Kishore, Salim Roukos, Todd Ward and Wei-Jing Zhu, "Bleu: a Method for Automatic Evaluation of Machine Translation," Proceedings of the 40th Annual Meeting of the Association for Computational Linguistics, Philadelphia, Jul. 2002, 8 pages.

Barzilay, Regina and Michael Elhadad, "Using Lexical Chains for Text Summarization," In Proceedings of the ACL/EACL 1997 Workshop on Intelligent Scalable Text Summarization, pp. 10-17.

Srihari, Rohini K. anad Charlotte M. Baltus, "Combining Statistical and Syntactic Methods in Recognizing Handwritten Sentences," In AAAI Symposium: Probabilistic Approaches to Natural Language, 1992, pp. 121-127.

Lin, Chin-Yew, "Rouge: A Package for Automatic Evaluation of Summaries," Workshop on Text Summarization Branches Out, Jul. 2004, 23 pages.

"TREC 9 (2000) Web Track," Text Retrieval Conference (TREC) 9 Web Track, Last Updated Jul. 16, 2004, http://trec.nist.gov/data/t9.web.html, last accessed Dec. 29, 2005, 1 page.

"DUC 2001 Guidelines," last updated Jul. 7, 2004, http://www-nlpir.nist.gov/projects/duc/guidelines/2001.html, last accessed Dec. 29, 2005, 3 pages.

"Statistical significance of correlation coefficient," Department of Obstetrics and Gynecology, The Chinese University of Hong Kong, http://department.obg.cuhk.edu.hk/ResearchSupport/Correlation_coeff.asp, last accessed Dec. 29, 2005, 1 page.

Clarkson, Philip, "The CMU-Cambridge Statistical Language Modeling Toolkit v2," Carnegie Mellon University, http://mi.eng.cam.ac.uk/prc14/toolkit_documentation.html, last accessed Aug. 8, 2005, 17 pages.

Mannor, Shie, Dori Peleg and Reuven Rubinstein, "The cross entropy method for classification," Proceedings of the 22nd International Conference on Machine Learning, Bonn, Germany, 2005, 8 pages.

Chen, Stanley F. and Joshua Goodman, "An Empirical Study of Smoothing Techniques for Language Modeling," TR-10-98, Aug. 1998, Harvard University Computer Science Group, pp. 1-63.

Goldman, Robert, "Probabilistic Approaches to Natural Language," Abstract, AAAI Fall Symposium, Technical Report FS-92-04, The AAAI Press, http://www.aaai.org/Press/Reports/Symposia/Fall/fs-92-04.html, last accessed Jul. 21, 2005, 3 pages.

* cited by examiner

EVALUATING AND GENERATING SUMMARIES USING NORMALIZED PROBABILITIES

BACKGROUND

The Internet allows users to access millions of electronic documents, such as electronic mail messages, web pages, memoranda, design specifications, electronic books, and so on. Because of the large number of documents, it can be difficult for users to locate documents of interest. To locate a document, a user may submit search terms to a search engine. The search engine identifies documents that may be related to the search terms and then presents indications of those documents as the search result. When a search result is presented, the search engine may attempt to provide a summary of each document so that the user can quickly determine whether a document is really of interest. Some documents may have an abstract or summary section that can be used by the search engine. Many documents, however, do not have abstracts or summaries. The search engine may automatically generate a summary for such documents. The automatic text summarization techniques can be used to summarize many different types of documents other than web pages such as business reports, political reports, technical reports, news articles, chapters of books, and so on. The usefulness of the automatically generated summaries depends in large part on how effectively a summary represents the main concepts of a document.

Many different algorithms have been proposed for automatic text summarization. Luhn proposed an algorithm that calculates the significance of a sentence to a document based on keywords of the document that are contained within the sentence. In particular, a Luhn-based algorithm identifies a portion of the sentence that is bracketed by keywords that are not more than a certain number of non-keywords apart. The significance of a sentence as calculated by a Luhn-based algorithm is a score that reflects the density of keywords within the bracketed portion. The Luhn-based algorithm may calculate the score of a sentence as the ratio of the square of the number of keywords contained in the bracketed portion divided by the number of words within the bracketed portion. The sentences with the highest scores are selected to form the summary. (See H. P. Luhn, *The Automatic Creation of Literature Abstracts*, 2 IBM J. OF RES. & DEV. No. 2, 159-65 (April 1958).)

Other summarization algorithms use latent semantic analysis ("LSA") to generate an LSA score for each sentence of a document. A latent semantic analysis summarization technique uses singular value decomposition to generate a score for each sentence. An LSA summarization technique may generate a word-sentence matrix for the document that contains a weighted term-frequency value for each word-sentence combination. The matrix may be represented by the following:

$$A = U \Sigma V^T \qquad (1)$$

where A represents the word-sentence matrix, U is a column-orthonormal matrix whose columns are left singular vectors, $\Sigma$ is a diagonal matrix whose diagonal elements are non-negative singular values sorted in descending order, and V is an orthonormal matrix whose columns are right singular vectors. After decomposing the matrix into U, $\Sigma$, and V, an LSA summarization technique uses the right singular vectors to generate the scores for the sentences. The sentences with the highest scores are selected to form the summary. (See Y. H. Gong & X. Liu, *Generic Text Summarization Using Relevance Measure and Latent Semantic Analysis*, in PROC. OF THE 24TH ANNUAL INTERNATIONAL ACM SIGIR, New Orleans, La., 19-25(2001).)

Although both Luhn and LSA summarization techniques generally generate effective summaries, it is difficult to accurately assess, either objectively or subjectively, the effectiveness of a summary at representing the main concepts of the document.

SUMMARY

A summary system for evaluating summaries of documents and for generating summaries of documents based on normalized probabilities of portions of the document is provided. A summarization system initially generates a document model for the document to be summarized. The document model is a statistical language model with a probability distribution that reflects the frequency with which a certain string of words occurs in the document. The summarization system then calculates a score derived from the normalized probability for each of the portions (e.g., sentences or paragraphs) of the document. The probability of a portion of a document is the probability of that portion occurring in the document given the probabilities of the document model. The summarization system uses normalized probabilities of the portions to reflect how closely words of the portion match the overall probabilities of the document model. The summarization system may use a cross entropy score or a perplexity score that are derived from the probabilities. After the scores of the portions are calculated, the summarization system selects the portions of the document to form the summary based on the scores.

An evaluation system evaluates the effectiveness of a summary of a document based on normalized probabilities of portions of the summary. The evaluation system generates a document model that indicates the probabilities for the occurrence of words in the document. The evaluation system then calculates a score based on the normalized probability for each portion of the summary and then combines the scores into an overall score for the summary. The evaluation system may use a cross entropy score or a perplexity score that are derived from the probabilities. The score indicates the effectiveness of the summary in representing the document.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
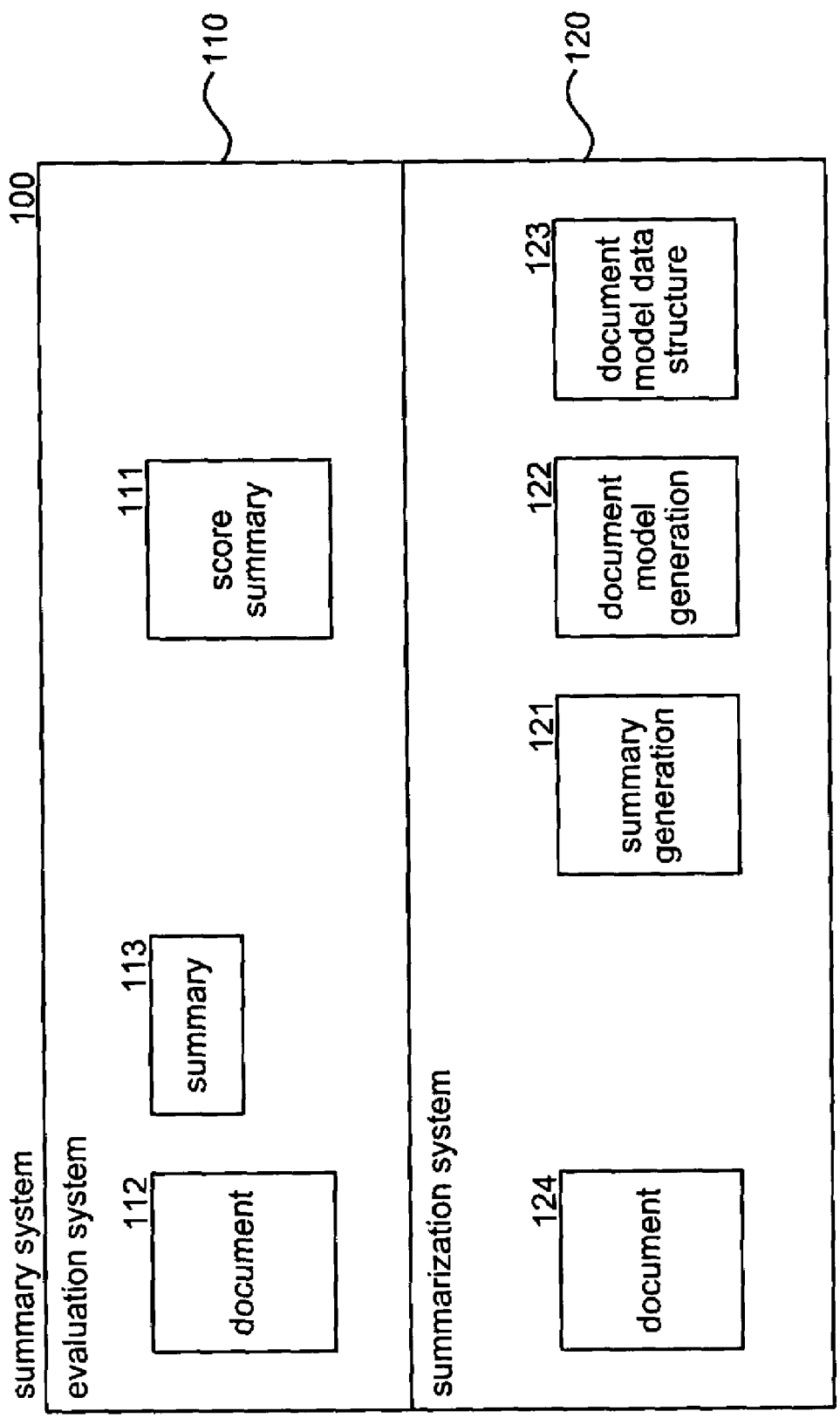
FIG. 1 is a block diagram that illustrates components of the summary system in one embodiment.

A method and system for generating a document summary based on normalized probabilities of sentences of the document is provided. In one embodiment, the summarization system initially generates a document model for the document to be summarized. The document model is a statistical language model with a probability distribution that reflects the frequency with which a certain string of words occurs in the document. A document model is referred to as an N-gram model when the strings contain N words each. The summarization system may use a trigram model. If so, the document model indicates, for each word of the document, the probability that it will occur after each possible bigram. For example, if the document contains 20 occurrences of the bigram "one skilled" and 15 occurrences of the trigram "one skilled in" and 5 occurrences of the trigram "one skilled would," then the probability that "in" will follow "one skilled" is 0.75 and the probability that "would" will follow "one skilled" is 0.25. The summarization system then calculates a score based on a normalized probability for each of the sentences of the document. The score reflects how closely the probability distribution for the sentence matches the probability distribution for the document. The probability of a sentence of a document is the probability of that sentence occurring in the document given the probabilities of the document model. In particular, the probability of a sentence is the product of the trigram probabilities of the words of the sentence. Because sentences can have varying lengths and thus probabilities can vary by orders of magnitude, the summarization system attempts to normalize the probabilities of the sentences to reflect how closely words of the sentence match the overall probabilities of the document model. For example, the summarization system may estimate a normalized probability for a sentence as an average probability of the words of the sentence. Alternatively, the summarization system may use a cross entropy score or a perplexity score that is derived from the probabilities. After the scores of the sentences are calculated, the summarization system selects the sentences with the best scores (i.e., with probability distributions that best match the document model) to form the summary of the document. In this way, the summarization system can automatically generate summaries based on how well sentences of the document match the document model.

In one embodiment, an evaluation system evaluates the effectiveness of a summary of a document based on normalized probabilities of sentences of the summary. The evaluation system generates a document model (e.g., with the summary considered a portion of the document) that indicates the probabilities by which the various N-grams occur in the document. The evaluation system then calculates a score based on a normalized probability for each sentence of the summary and combines them into an overall score for the summary. The evaluation system may use a cross entropy score or a perplexity score derived from the probabilities. In such a case, summaries with lower cross entropy or perplexity scores are more effective at representing the document than summaries with higher cross entropy or perplexity scores.

In one embodiment, a summary system includes a summarization system and an evaluation system that both calculate scores of sentences based on a document model. The summary system uses a trigram document model to represent the probabilities of words occurring in a document by the following equation:

$$p(w_i|w_{i-1}w_{i-2}) = c(w_{i-2}w_{i-1}w_i)/\Sigma_{w_i} c(w_{i-2}w_{i-1}w_i) \qquad (2)$$

where $p(w_i|w_{i-1}w_{i-2})$ represents the trigram probability the word $w_i$ will follow the bigram $w_{i-1}w_{i-2}$. The probability of a sentence is represented by the following equation:

$$p(s) = \prod_{i=1}^{l} p(w_i | w_i \ldots w_{i-1}) \approx \prod_{i=1}^{l} p(w_i | w_{i-1} w_{i-2}) \qquad (3)$$

where p(s) represents the probability of sentence s given a probability distribution derived from a document and l represents the number of words in the sentence. The cross entropy is represented by the following equation:

$$H_T(D) = -\frac{1}{W_D} \log_2 P_T(D) \qquad (4)$$

where $H_T(D)$ represents the cross entropy between a document model for document T and data D, $P_T(D)$ represents the probability of data D based on the document model, and $W_D$ is the length of the data. The division by the length of the data normalizes the probability. The perplexity is represented by the following equation:

$$PP_T(D) = 2^{H_T(D)} = 2^{\frac{1}{W_D}\log_2 P_T(D)} = P_T(D)^{-1/W_D} \qquad (5)$$

where $PP_T(D)$ represents the perplexity between the document model derived from document T and data D. Cross entropy and perplexity measure the divergence between a correct model and an estimated model. The summary system uses the document model derived from the model as the correct model and a sentence as the estimated model. Thus, the sentences of the document that diverge the least from the document model have trigrams that are likely representative of the document concepts and thus may be best at describing the concepts of the document.

In one embodiment, the summarization system generates a summary of a document calculating the perplexity of each sentence of the document. The summarization system then selects the sentences with the lowest perplexity (i.e., best score) to form the summary of the document. The summarization system may select sentences until the ratio of the size of the summary to the size of the document is approximately the compression ratio of the document. The compression ratio of a document may be derived from the entropy of the document and may represent the highest theoretical compression for that document.

FIG. 1 is a block diagram that illustrates components of the summary system in one embodiment. The summary system 100 includes an evaluation system 110 and a summarization system 120. The evaluation system includes a document 112 and its summary 113 and a score summary component 111. The score summary component inputs the document and its summary and calculates the perplexity that represents the effectiveness of the summary in representing the document. The summarization system includes a summary generation component 121, a document model generation component 122, document model data structures 123, and a document 124. The summary generation component inputs the document and generates a summary for the document based on normalized probabilities of the sentences of the document. The summary generation component invokes the document model generation component to generate a document model based on the document. The document model generation component uses the document model data structures to track the occurrences of bigrams and trigrams in the document for use in calculating trigram probabilities. The score summary component also invokes the document model generation component to generate a document model for use in evaluating the effectiveness of a summary.

Figure 2:
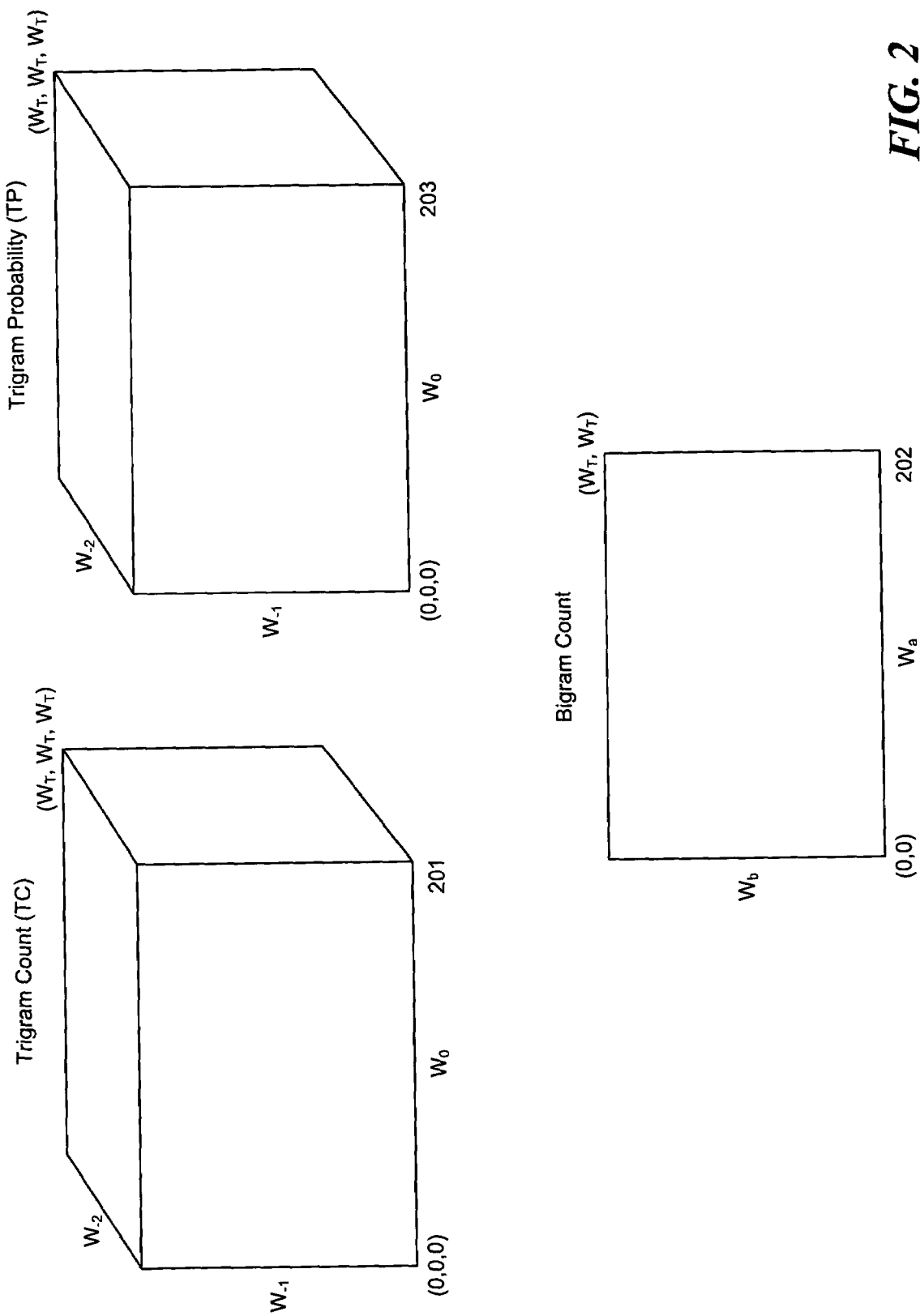
FIG. 2 is a block diagram that illustrates the document model data structures of the summary system in one embodiment.

FIG. 2 is a block diagram that illustrates the document model data structures of the summary system in one embodiment. The data structures include a trigram count data structure 201, a bigram count data structure 202, and a trigram probability data structure 203. The trigram count data structure is a three-dimensional array with the words of the document as the indexes of each dimension. Thus, if the document contains $W_T$ distinct words then each dimension has $W_T$ indexes. The summary system accumulates the count of the trigrams of the document into the trigram count data structure. For example, the entry of the trigram count data structure for the trigram "one skilled in" may contain a 15, and the entry for the trigram "one skilled would" may contain a 5. The bigram count data structure is a two-dimensional array with the words of the documents as the indexes in each dimension. The summary system accumulates the count of bigrams of the document into the bigram data structure. For example, the entry of the bigram count data structure for the bigram "one skilled" may contain a 20. The trigram probability data structure is a three-dimensional array with the words of the documents as the indexes in each dimension. The summary system calculates the probability of the trigrams of the document by dividing the entries of the trigram count data structure by the corresponding entries of the bigram count data structure and stores the result in the trigram probability data structure. For example, the entry of the trigram probability data structure for the trigram "one skilled in" may contain a 0.75, and the entry for the trigram "one skilled would" may contain a 0.25. These data structures are representative of possible data structures that could be used to generate and represent the document model. The trigram probability data structure represents the document model.

The computing device on which the summary system is implemented may include a central processing unit, memory, input devices (e.g., keyboard and pointing devices), output devices (e.g., display devices), and storage devices (e.g., disk drives). The memory and storage devices are computer-readable media that may contain instructions that implement the summary system. In addition, the data structures and message structures may be stored or transmitted via a data transmission medium, such as a signal on a communications link. Various communications links may be used, such as the Internet, a local area network, a wide area network, or a point-to-point dial-up connection.

The summary system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The summary system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
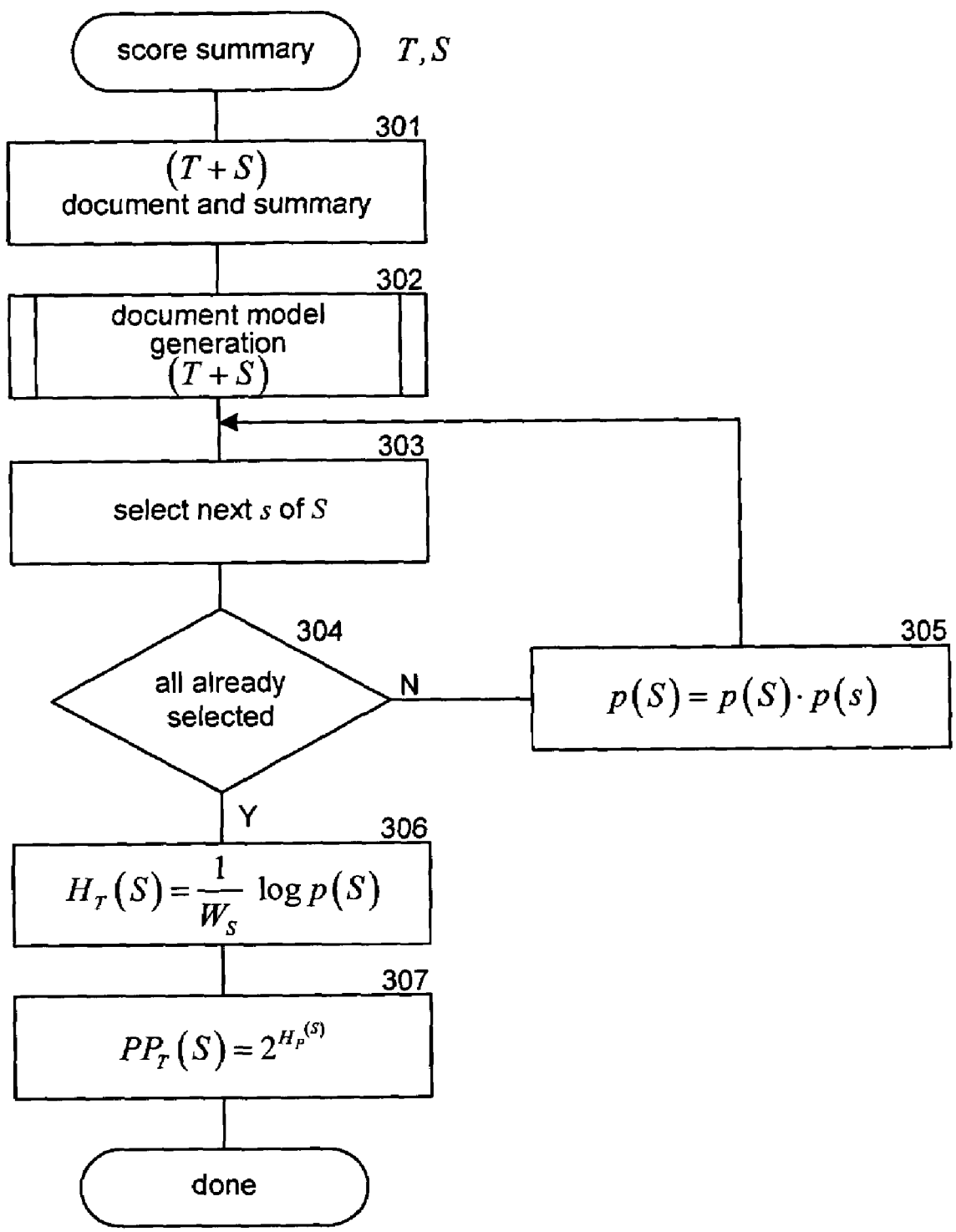
FIG. 3 is a flow diagram that illustrates the processing of the score summary component in one embodiment.

FIG. 3 is a flow diagram that illustrates the processing of the score summary component in one embodiment. The component is passed a document T and a summary S. The component calculates the perplexity between the summary and the document as a score of the effectiveness of the summary in representing the document. In block 301, the component combines the document and summary for use in generating the document model. The combining of the summary with the document ensures that all the words of the summary are included in the summary. In block 302, the component invokes the document model generation component passing the combination of the document and the summary. In blocks 303-305, the component loops calculating the probability of each sentence of the summary based on the document model. In block 303, the component selects the next sentence of the summary. In decision block 304, if all the sentences have already been selected, then the component continues at block 306, else the component continues at block 305. In block 305, the component calculates the probability of the selected sentence and combines it with the running probability of the summary and then loops to block 303 to select the next sentence of the summary. In block 306, the component calculates the cross entropy between the summary and generated document model using Equation 4. In block 307, the component calculates the perplexity between the summary and the document model using Equation 5 and then completes.

Figure 4:
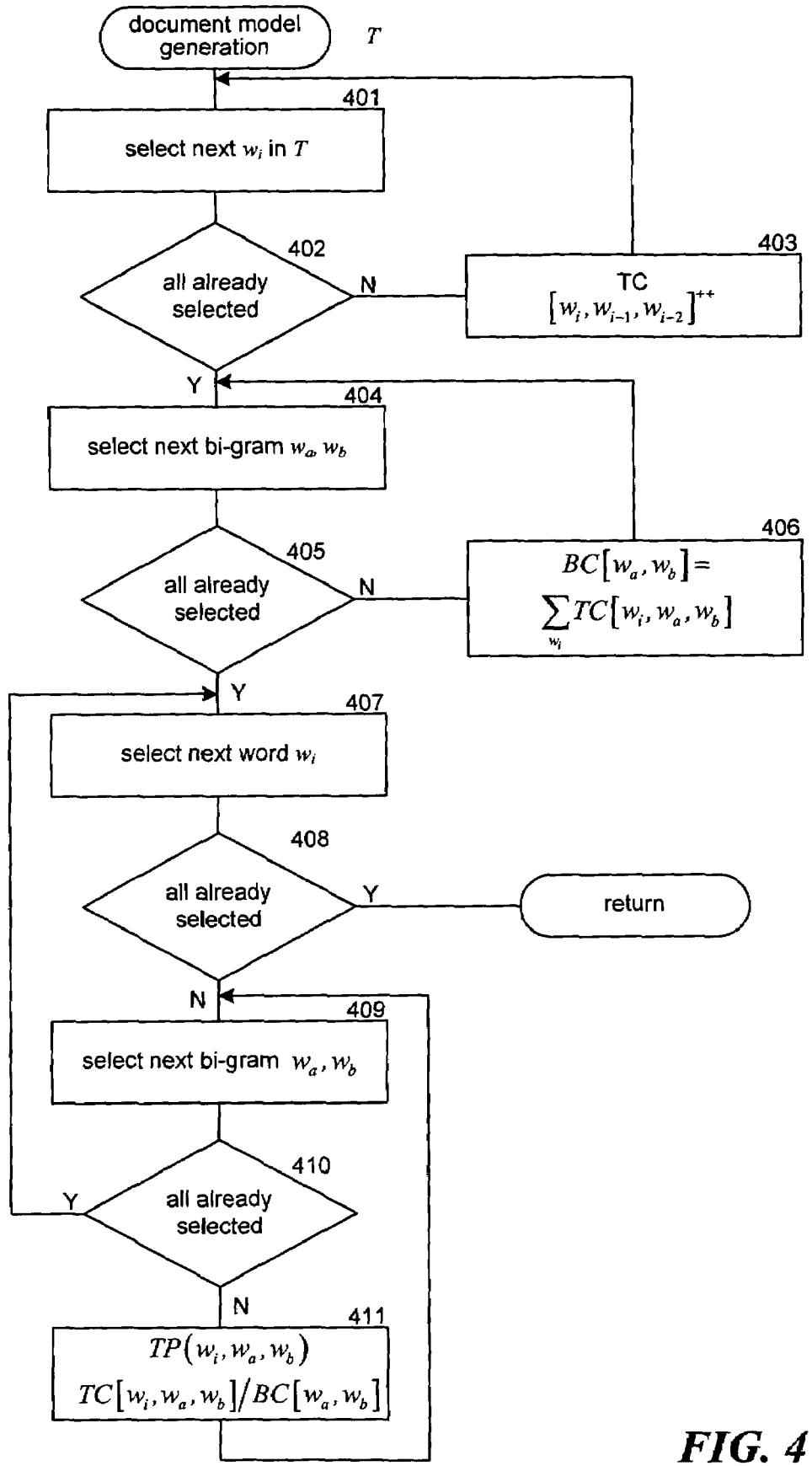
FIG. 4 is a flow diagram that illustrates the processing of the document model generation component of the summary system in one embodiment.

FIG. 4 is a flow diagram that illustrates the processing of the document model generation component of the summary system in one embodiment. The component is passed a document and generates a probability for each trigram in the document that represents the document model. Because the number of possible trigrams (i.e., each possible combination of three word sequences formed from the words of the document) is typically very large and the number of trigrams in a document is relatively small, the count of trigrams for a document only sparsely fills the trigram space. As a result, the component may use various smoothing techniques such as absolute discounting, Good-Turing, Witten-Bell, and linear interpolation to fill in the empty counts. In blocks 401-403, the component loops calculating the number of occurrences of each trigram within the document. In block 401, the component selects the next trigram of the document starting at the beginning of the document. In decision block 402, if all the trigrams have already been selected (i.e., the end of the document has been reached), then the component continues at block 404, else the component continues at block 403. In block 403, the component increments the count in the trigram count data structure for the selected trigram and then loops to block 401 to select the next trigram. In blocks 404-406, the component loops calculating the number of occurrences of each bigram within the document. In block 404, the component selects the next bigram from the trigram count data structure. In decision block 405, if all the bigrams have already been selected, then the component continues at block 407, else the component continues at block 406. In block 406, the component sets the entry of the bigram count data structure for the selected bigram to the total count of the selected bigram in the document, which can be found by summing the entries by holding two dimensions of the trigram count data structure constant and varying the third dimension. The loops of blocks 401-406 can be combined into a single loop such that when a trigram is selected the count of its two component bigrams can be incremented. In blocks 407-411, the component loops calculating the trigram probability for each trigram. In block 407, the component selects the next word along a dimension of the trigram probability data structure. In decision block 408, if all such words have already been selected, then the component returns, else the component continues at block 409. In block 409, the component selects the next bigram by varying the other two dimensions of the trigram probability data structure. In decision block 410, if all the bigrams have already been selected, the component loops to block 407 to select the next word, else the component continues at block 411. In block 411, the component sets the entry of the trigram probability data structure indexed by the selected word and the selected bigram to the trigram count of the selected word and selected bigram divided by the bigram count for the selected bigram. The component then loops to block 409 to select the next bigram.

Figure 5:
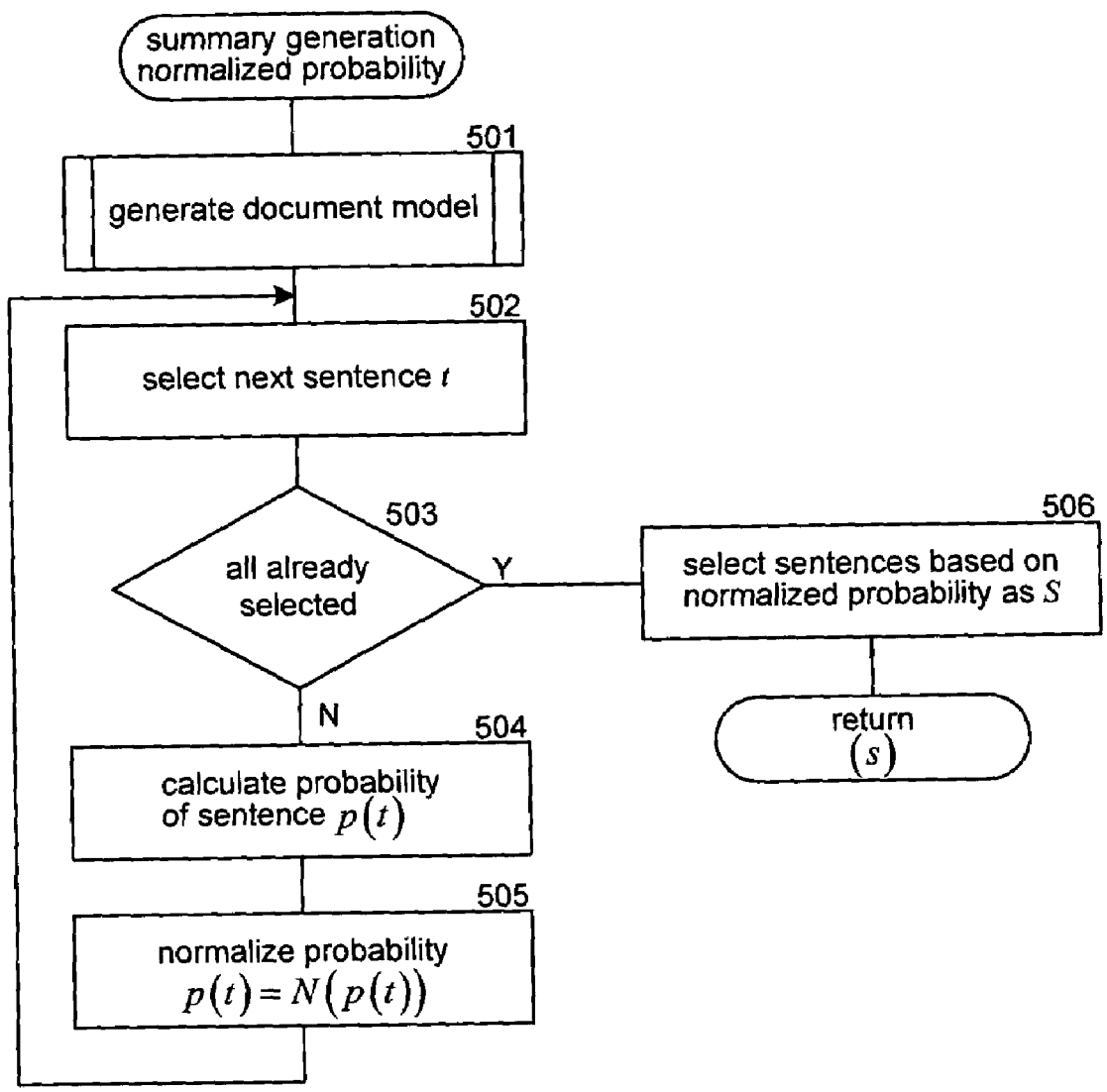
FIG. 5 is a flow diagram that illustrates the processing of the summary generation component that uses normalized probability in one embodiment.

FIG. 5 is a flow diagram that illustrates the processing of the summary generation component that uses normalized probability in one embodiment. The component is passed a document and generates a summary for that document. In block 501, the component invokes the document model generation component passing the document to generate the document model for the document. In blocks 502-505, the component loops calculating the normalized probability for each sentence of the document. In block 502, the component selects the next sentence of the document. In decision block 503, if all the sentences have already been selected, then the component continues at block 506, else the component continues at block 504. In block 504, the component calculates the probability of the selected sentence based on the generated document model using Equation 3. In block 505, the component calculates a normalized probability for the selected sentence by applying a normalization function such as a cross entropy or perplexity function. The component then loops to block 502 to select the next sentence of the document. In block 506, the component selects sentences to be used in the summary based on the normalized probability. For example, the component may select a certain number of sentences with the lowest perplexity. The component then returns the summary.

Figure 6:
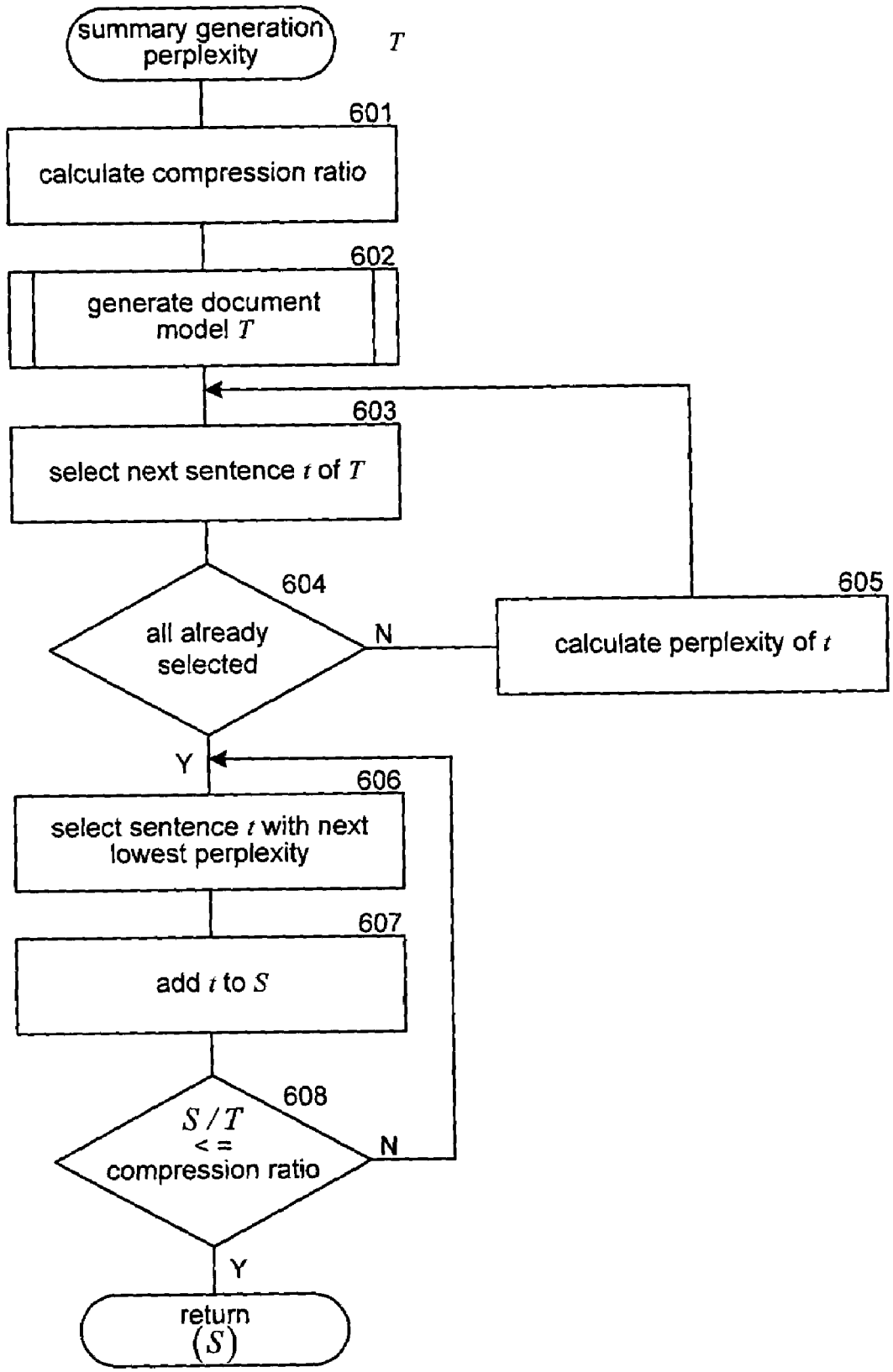
FIG. 6 is a flow diagram that illustrates the processing of the summary generation component that uses a perplexity score in one embodiment.

FIG. 6 is a flow diagram that illustrates the processing of the summary generation component that uses a perplexity score in one embodiment. The component is passed a document and generates a summary for the document. In block 601, the component calculates a compression ratio for the document, for example, based on entropy to indicate the theoretical maximum compression ratio for the document. The component may add sentences to the summary until the ratio of the size of the summary to the size of the document reaches the compression ratio. In block 602, the component invokes the document model generation component to generate the document model for the passed document. In blocks 603-605, the component loops calculating the perplexity of each sentence of the passed document. In block 603, the component selects the next sentence of the document. In decision block 604, if all the sentences have already been selected, the component continues at block 606, else the component continues at block 605. In block 605, the component calculates the perplexity of the selected sentence using Equation 5 and the generated document model. The component then loops to block 603 to select the next sentence. In blocks 606-608, the component loops adding sentences to the summary. In block 606, the component selects the sentence with the next lowest perplexity. In block 607, the component adds the selected sentence to the summary. In decision block 608, if the ratio of the size of the summary to the size of the document is less than or equal to the compression ratio, then the component returns the summary, else the component loops to block 606 to select the next sentence to be included in the summary.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the summary system may be applied to portions of a document other than sentences. The portions can be paragraphs, phrases, and so on. For example, if a document is long, then the normalized probability of paragraphs based on the document model derived from the entire document can be used to select the paragraphs to be included in the summary. Also, the summary system may use N-grams of any length for the document model. The length of a summary may be based on various thresholds such as the compression ratio of the document, a fixed number of sentences, a difference between the scores of sentences in the summary and the score of the next sentence to be added to the summary, number of words of the summary, number of pages of the summary, and so on. Accordingly, the invention is not limited except as by the appended claims.

We claim:

1. A method performed by a computer having a processor and a memory for generating a document summary, the method comprising:

with the processor, providing a first document model for a document, the first document model is a statistical language model with a probability distribution that reflects a frequency with which trigrams occur in the document and which is based only on the document itself, the probability distribution is generated by:

counting a number of occurrences of each trigram within the document, for each bigram, determining a number of occurrences of the bigram within the document by summing the number of occurrences of each trigram within the document that begins with the bigram, and for each trigram, calculating a probability of observing the trigram in the document by dividing the number of occurrences of the trigram within the document by the number of occurrences of the bigram within the document that comprises a first two words of the trigram and storing the calculated probability in the memory;

calculating scores based on normalized probabilities for sentences of the document based on the first document model, a normalized probability is a product of the probabilities of the trigrams in a sentence adjusted by a length of the sentence;

selecting one or more sentences based on the scores of the sentences to form the summary of the document;

storing the summary in the memory;

generating a second document model for the document and the generated summary that indicates probabilities by which the various trigrams occur in the document and the generated summary;

for each portion of the summary, calculating a score based on the probabilities indicated by the second document model; and combining the calculated score of each portion of the summary to generate an overall score for assessing the effectiveness of the summary.

2. The method of claim 1 wherein the selecting selects sentences until a ratio between a size of the summary and a size of the document is met.

3. The method of claim 2 wherein the ratio is a compression ratio of the document.

4. The method of claim 3 wherein the compression ratio is derived from an entropy of the document and the size of the document.

5. A computer-readable storage medium containing computer executable instructions for controlling a computer system to generate a document summary and evaluate an effectiveness of the generated document summary, by a method comprising:

generating a first document model for a document, the first document model is a statistical language model with a probability distribution that reflects a frequency with which n-grams occur in the document, the probability distribution is generated by:

counting a number of occurrences of each n-gram within the document, for each (n-1)-gram, determining a number of occurrences of the (n-1)-gram within the document by summing the number of occurrences of each n-gram within the document that begins with the (n-1)-gram, and for each n-gram, dividing the number of occurrences within the document of the n-gram by the number of occurrences within the document of the (n-1)-gram that comprises a first n-1 words of the n-gram, wherein only the document itself serves as basis for generating the first document model;

for each of a plurality of selected portions of the document, calculating a score based on normalized probability for the selected portion from the n-grams of words of the selected portion given the first document model, the normalized probability is based on a cross entropy between the selected portion of the document and the document adjusted by a length of the selected portion;

selecting one or more portions based on their scores as the summary of the document;

generating a second document model for the document and the generated summary that indicates probabilities by which the various n-grams occur in the document and the generated summary;

for each portion of the summary, calculating a score based on the probabilities indicated by the second document model; and combining the calculated score of each portion of the summary to generate an overall score for assessing the effectiveness of the summary.

6. The computer-readable storage medium of claim 5 wherein each n-gram is a trigram.

7. The computer-readable storage medium of claim 5 wherein the portions are sentences.

8. The computer-readable storage medium of claim 5 wherein the portions are paragraphs.

9. The computer-readable storage medium of claim 5 wherein the selecting selects portions until a threshold is met.

10. The computer-readable storage medium of claim 5 wherein the n-gram is a trigram, wherein the portions are sentences, and wherein the selecting selects portions until a threshold is met.

11. A method performed by a computer having a memory for scoring effectiveness of a summary in summarizing a document, the method comprising:

generating by a computer a first document model for the document, the first document model is a statistical language model with a probability distribution that reflects a frequency with which n-grams occur in the document, the probability distribution is generated by:

counting a number of occurrences of each n-gram within the document, determining a number of occurrences of each (n-1)-gram within the document by summing the number of occurrences of each n-gram within the document that begins with the (n-1)-grams, and calculating a probability for each n-gram based on the number of occurrences of the n-gram and the (n-1)-gram that comprises a first n-1 words of the n-gram in the document by, for each n-gram, dividing the number of occurrences within the documents of the n-gram by the number of occurrences within the document of the (n-1)-gram that comprises the first n-1 words of the n-gram;

wherein only the document itself serves as basis for generating the first document model;

selecting one or more portions based on their scores as the summary of the document based on calculating a score based on a normalized probability for the selected portion from the n-gram of words of the selected portions given the first document model, the normalized probability is based on a cross entropy between a selected portion of the document and the document adjusted by a length of the selected portion;

storing the summary in the memory;

calculating probabilities of portions of the summary based on the first document model;

generating a second document model for the document and the generated summary that indicates probabilities by which the various n-grams occur in the document and the generated summary;

for each portion of the summary, calculating a score based on the probabilities indicated by the second document model; and combining the calculated score of each portion of the summary to generate an overall score for assessing the effectiveness of the summary.

* * * * *